shaft operative to rotationally drive said body, and self-feeding means extending axially outwardly from one side of said body, said self-feeding means being operative to engage said workpiece and to draw said boring tool therethrough a predetermined distance in response to each revolution of said boring tool, said body futher having a cutting edge provided thereon operative to shear material from said workpiece, said cutting edge being axially spaced from said one side of said body a distance substantially equal to said predetermined distance whereby said cutting edge is operative to provide a depth of cut substantially equal to the axial distance said boring tool advances in response to each revolution and said cutting edge and said self-feeding means cooperate to provide a synchronized feed rate.

2. A boring tool as set forth in claim 1 wherein said self-feeding means comprises a concially shaped projection having a plurality of helical threads thereon, said threads having a pitch substantially equal to said predetermined distance.

3. A boring tool as set forth in claim 1 wherein said body has a plurality of cutting elements secured thereto in circumferentially spaced relationship, each of cutting elements having a cutting edge provided thereon.

4. A boring tool as set forth in claim 3 wherein said cutting elements include a pair of spur cutters and at least one planer blade.

5. A boring tool as set forth in claim 1 wherein said self-feeding means is integrally formed with said driving shaft.

6. A boring tool as set forth in claim 5 wherein said body has a bore extending therethrough, said driving shaft extending through said bore, and retaining means provided on said body for securing said driving shaft within said bore, said retaining means being disposed so as to urge said self-feeding means into close proximity to said cutting edge.

7. A boring tool as set forth in claim 1 wherein said one side of said body further includes feed rate limiting means.

8. A boring tool as set forth in claim 7 wherein said feed rate limiting means comprises a raised surface portion engageable with said workpiece and said cutting edges are axially spaced from said raised surface portion a distance substantially equal to said predetermined distance.

9. A boring tool as set forth in claim 8 wherein said raised surface portion is in the form of a peripheral curb portion.

10. In a boring tool comprising a body, a plurality of spur cutters secured to the periphery of said body in circumferentially spaced relationship, at least one planer blade secured to said body and positioned in radially inwardly and circumferentially spaced relationship with respect to said spur cutters, a driving shaft including self-feeding means at one end extending through and adapted to rotationally drive said body portion, means for securing said body portion to said driving shaft with said self-feeding means extending axially outwardly from one side of said body and wherein each of said spur cutters and said planer blade includes radially extending cutting edges positioned a predetermined distance above said one side of said body and said self-feeding means being operative to engage said workpiece and advance said boring tool relative thereto a distance substantially equal to said predetermined distance in response to each revolution of said boring tool.

11. A boring tool as set forth in claim 10 wherein said securing means is further operative to urge said self-feeding means radially into close proximity to said planer blade.

12. A boring tool as set forth in claim 11 wherein said securing means comprises a radially inwardly extending threaded opening in said body, a set screw in threaded engagement with said opening and engageable with said shaft.

13. A boring tool as set forth in claim 10 wherein said self-feeding means comprises a helically threaded generally conically shaped portion, said threads having a pitch substantially equal to said predetermined distance.

14. A boring tool as set forth in claim 13 wherein said body further includes a peripheral curb extending axially outwardly from said one side, said curb having a radially extending surface operative to engage said workpiece so as to limit the rate at which said boring tool is advanced relative thereto, said predetermined distance being measured from said cutting edge to said radially extending surface.

15. A boring tool as set forth in claim 14 wherein said radially extending surface defines a plane disposed substantially perpendicular to the axis of rotation of said boring tool.

16. In a boring tool for boring relatively large diameter openings in a workpiece comprising a body, a driving shaft operative to rotationally drive said body, and self-feeding means extending axially outwardly from one side of said body, said self-feeding means being operative to engage said workpiece and to draw said boring tool therethrough a predetermined distance in response to each revolution of said boring tool, said body further having a plurality of cutting elements provided thereon operative to shear material from said workpiece, said cutting elements including at least one spur cutter and a planer blade secured to said body in circumferentially spaced relationship and each having a radially extending cutting edge, said one side of said body further including a raised surface portion engageable with said workpiece, said cutting edges being axially spaced from said raised surface portion of said body a distance substantially equal to said predetermined distance whereby said cutting edges are operative to provide a depth of cut substantially equal to the axial distance said boring tool advances in response to each revolution and said cutting edges and said self-feeding means cooperate to provide a synchronized feed rate.

17. In a boring tool comprising a body, a plurality of spur cutters secured to the periphery of said body in circumferentially spaced relationship, at least one planer blade secured to said body and positioned in radially inwardly and circumferentially spaced relationship with respect to said spur cutters, a driving shaft including self-feeding means at one end extending through and adapted to rotationally drive said body portion, a radially inwardly extending threaded opening in said body, a set screw in threaded engagement with said opening and engageable with said shaft for securing said body portion to said driving shaft with said self-feeding means extending axially outwardly from one side of said body, said set screw being operative to urge said self-feeding means radially into close proximity to said planer blade, said one side of said body further including a raised surface portion engageable with said workpiece and wherein each of said spur cutters and said planer blade includes a radially extending cutting edge positioned a predetermined distance above said raised surface portion of said body and said self-feeding means being operative to engage said workpiece and advance said boring tool relative thereto a distance substantially equal to said predetermined distance in response to each revolution of said boring tool.

* * * * *

United States Patent [19]

Demuth

[11] 4,244,668
[45] Jan. 13, 1981

[54] APPARATUS FOR FORMING INTERNAL TEETH AT LARGE WORKPIECES AT A GEAR SHAPER

[75] Inventor: Walter Demuth, Wallisellen, Switzerland

[73] Assignee: Maag Gear-Wheel & Machine Co., Ltd., Zürich, Switzerland

[21] Appl. No.: 38,624

[22] Filed: May 14, 1979

[30] Foreign Application Priority Data

Jun. 2, 1978 [CH] Switzerland ............................ 6063/78

[51] Int. Cl.³ ............................. B23F 1/04; B23F 5/12
[52] U.S. Cl. ........................................ 409/46; 51/287; 409/1; 409/42; 409/296
[58] Field of Search ........................ 409/42, 46, 47, 56, 409/34, 35, 1, 2, 3, 48, 296; 51/34 G, 287

[56] References Cited

U.S. PATENT DOCUMENTS

| 390,306 | 10/1888 | Morton | 409/296 |
|---|---|---|---|
| 1,492,627 | 5/1924 | Cole | 409/47 |
| 2,507,725 | 5/1950 | Leuthold | 409/47 |
| 3,841,198 | 10/1974 | Cornford | 409/2 |

Primary Examiner—Z. R. Bilinsky
Attorney, Agent, or Firm—Werner W. Kleeman

[57] ABSTRACT

An apparatus for forming internal gear teeth at large workpieces at a gear shaper or gear shaping machine comprising a machine bed at which there are arranged a workpiece table for chucking a workpiece and an upright or stand. The workpiece table and the stand are rotatable, relative to one another, about the workpiece axis and radially feedable relative thereto. The stand has guide means along which there can be moved to-and-fro a plunger by means of a plunger drive. An auxiliary stand is rotatably and radially displaceable about the workpiece axis upon a bearing rim which is coaxially attached at the workpiece. The auxiliary stand has a guide arrangement along which there can be moved to-and-fro, in the tooth lengthwise direction of the internal teeth, an auxiliary plunger driven by the plunger by means of a bridge arrangement.

12 Claims, 4 Drawing Figures

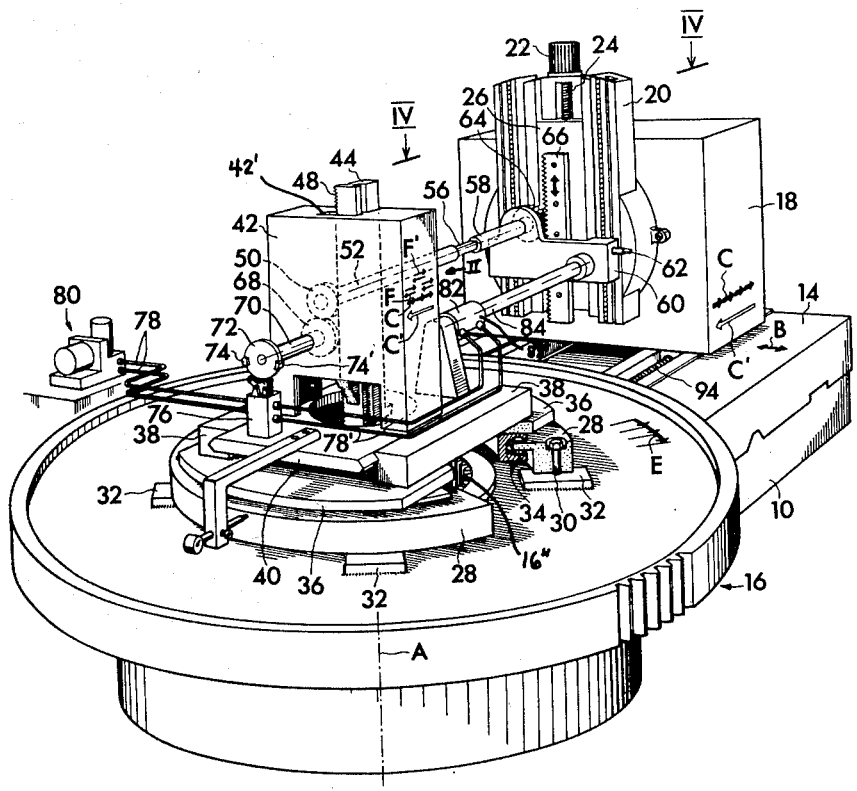

APPARATUS FOR FORMING INTERNAL TEETH AT LARGE WORKPIECES AT A GEAR SHAPER

BACKGROUND OF THE INVENTION

The present invention relates to a new and improved construction of apparatus for forming internal teeth at large workpieces at a gear shaping machine or gear shaper.

In its more specific aspects, the inventive apparatus for providing internal gear teeth at large workpieces at a gear shaping machine, comprises a machine bed upon which there are arranged a workpiece table for chucking or clamping a workpiece and an upright or stand. The workpiece table and stand are rotatable, relative to one another, about the workpiece axis and can be advanced or fed radially with respect thereto. The stand has guide means along which there can be moved to-and-fro a plunger by means of a plunger drive.

There are already known to the art gear shaping machines which, according to indexing techniques or part-rolling techniques, not only can fabricate external gear teeth, but also internal gear teeth, such as for instance spline teeth for shaft-hub connections as well as coupling or clutch teeth, with great accuracy and surface quality. To fabricate internal teeth the plunger, which carries the gear cutting tool, must have a cantilever, in other words, must protrude a certain distance away from the stand which is greater than one-half of the external diameter of the workpiece. In the case of workpieces of large diameter this causes difficulties, since if the plunger is extensively cantilevered, the machining forces exerted by the gear cutting tool, produce considerable bending moments at the plunger. Therefore, it is necessary to either tolerate appreciable deformations of the plunger, and thus, attendant impairment of the accuracy and surface quality of the internal teeth, or else the plunger must be structured to be particularly sturdy, and thus heavy, increasing the cost of the entire gear shaping machine and its operating speed is lowered. Hence, such machine then no longer operates economically when fabricating external gear teeth, and it is for this reason that it was necessary to produce the external teeth and the internal teeth of gears of large diameter at different machines. The necessity of re-chucking or clamping the workpiece, when working at different machines, again is associated with the drawback that, not only are there present time losses, but especially there cannot be prevented loss in accuracy of the arrangement, especially axial alignment, between the internal teeth and the external teeth.

SUMMARY OF THE INVENTION

Therefore, with the foregoing in mind it is a primary object of the present invention to provide a new and improved construction of apparatus for forming internal teeth at large workpieces at a gear shaper which is not associated with the aforementioned drawbacks and limitations of the prior art proposals.

Another and more specific object of the present invention aims at providing an apparatus for forming internal teeth at large workpieces, where it is possible, at heretofore known and existing gear shaping machines having a non-cantilevered plunger or only a modestly cantilevered plunger, and therefore suitable only for producing external teeth, to also fabricate central bores or hubs of large size gears with spline and/or clutch teeth.

Now in order to implement these and still further objects of the invention, which will become more readily apparent as the description proceeds, the apparatus of the present development is manifested by the features that an auxiliary stand is arranged rotatably and radially displaceable about the workpiece axis upon a bearing rim secured coaxially at the workpiece. This auxiliary stand has a guide arrangement or guide means along which there can be moved to-and-fro, in the teeth lengthwise direction of the internal teeth of the workpiece, an auxiliary plunger equipped with a gear cutter tool. This auxiliary plunger is driven by means of the aforementioned plunger through the intermediary of a bridge arrangement or bridge means.

With the inventive apparatus, which can be easily installed at existing gear shaping machines, the plunger drive moves, through the agency of the plunger and the bridge arrangement or bridge means, the auxiliary plunger to-and-fro. This to-and-fro movement is generally a vertical up-and-down movement, since gear shaping machines for larger workpieces generally are constructed such that the workpiece is chucked or clamped with its axis extending vertically at the machine table, and since internal teeth such as spline or clutch teeth formed at larger size workpieces, usually are straight or linear teeth. However, the inventive apparatus also can be structured such that there can be produced therewith helical internal teeth. To this end, it is only necessary that the guide means at the auxiliary stand can be adjusted at an inclination with respect to the lengthwise axis of the workpiece, as such is known for guide means at stands for gear shaping machines and other gear processing machines.

All of the movements of the inventive apparatus, needed for fabricating a tooth system, can be derived from drives which are provided anyway at the gear shaping machine. This is particularly valid, first of all, as concerns the displacement movements or strokes of the auxiliary plunger, which, as described, are generated by the plunger drive of the gear shaping machine. Moreover, the inventive bridge arrangement ensures that the auxiliary stand, and together therewith, the auxiliary plunger, participate in the radial feed or advance movements as well as also in the indexing movements and possible generating movements of the stand in relation to the workpiece table. The inventive apparatus therefore need not be equipped with its own drive. Consequently, it is simple and non-bulky in construction, and with appropriately low expenditure in work can be installed, on the one hand, at a gear shaping machine, and, on the other hand, at the workpiece which has been chucked or clamped at the machine table.

It is advantageous if the bridge arrangement or bridge means possesses a displacement or sliding drive, controlled by the plunger movements, in order to change the spacing of the auxiliary stand from the stand or upright. This displacement drive renders it possible to raise the gear cutting tool arranged at the auxiliary plunger, following each work stroke for the duration of the return stroke from the workpiece. Consequently, the tool can be protected and there can be produced internal teeth of highest surface quality. The displacement or sliding drive can not only be controlled by the plunger movements, but furthermore, its drive force can be obtained by a reversing gearing or transmission of known construction, for instance a spline gearing. According to preferred embodiments of the invention, the displacement drive however has its own power source, for instance an electrical, pneumatic or hydraulic power source.

Although, for the reasons described herein, it is advantageous to be able to periodically alter the spacing between the auxiliary stand and the stand, nonetheless the inventive bridge means also can be constructed such that it rigidly connects the auxiliary stand with the stand of the gear shaping machine. This is possible, for instance, when the inner diameter of the internal gearing, which is to be fabricated with the inventive apparatus, is sufficiently large in order to render possible a pivotal arrangement of the gear cutting tool at the auxiliary plunger, corresponding to the usual arrangement of the tool at the plunger of a gear shaping machine where the tool is pivoted away from the workpiece during each return stroke.

The inventive bridge means or arrangement can be structured such that it directly connects the auxiliary plunger with the plunger of the gear shaping machine. In this case, although the bridge means is loaded with bending moments by the machining or cutting forces, nonetheless bending of the bridge means does not have any appreciable effect upon the machining accuracy, since the auxiliary plunger, with adequate sturdy structuring of the auxiliary stand and the components carrying such, is sufficiently accurately guided.

According to preferred embodiments of the invention there are, however, avoided appreciable bending loads being applied to the bridge means and also the remaining components of the inventive apparatus in that, there is operatively associated with the bridge means a shaft which, on the one hand, is mounted at the stand, on the other hand, at the auxiliary stand. The shaft supports two pinions, of which the one meshes with a gear rack arranged at the plunger and the other with a gear rack arranged at the auxiliary plunger. It is possible, with relatively little expenditure, to design the shaft to be sufficiently strong in order to withstand the rotational moments or torques acting thereat without any appreciable torsion. Furthermore, even any significant torsion of the shaft does not have any effect upon the auxiliary plunger and its guiding at the auxiliary stand.

If the bridge means is provided with a displacement or sliding drive, then the shaft is telescopically extendable. Hence, the displacement drive either can be arranged at a rod which is essentially parallel to the shaft and interconnecting the stand with the auxiliary stand or at the shaft itself.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
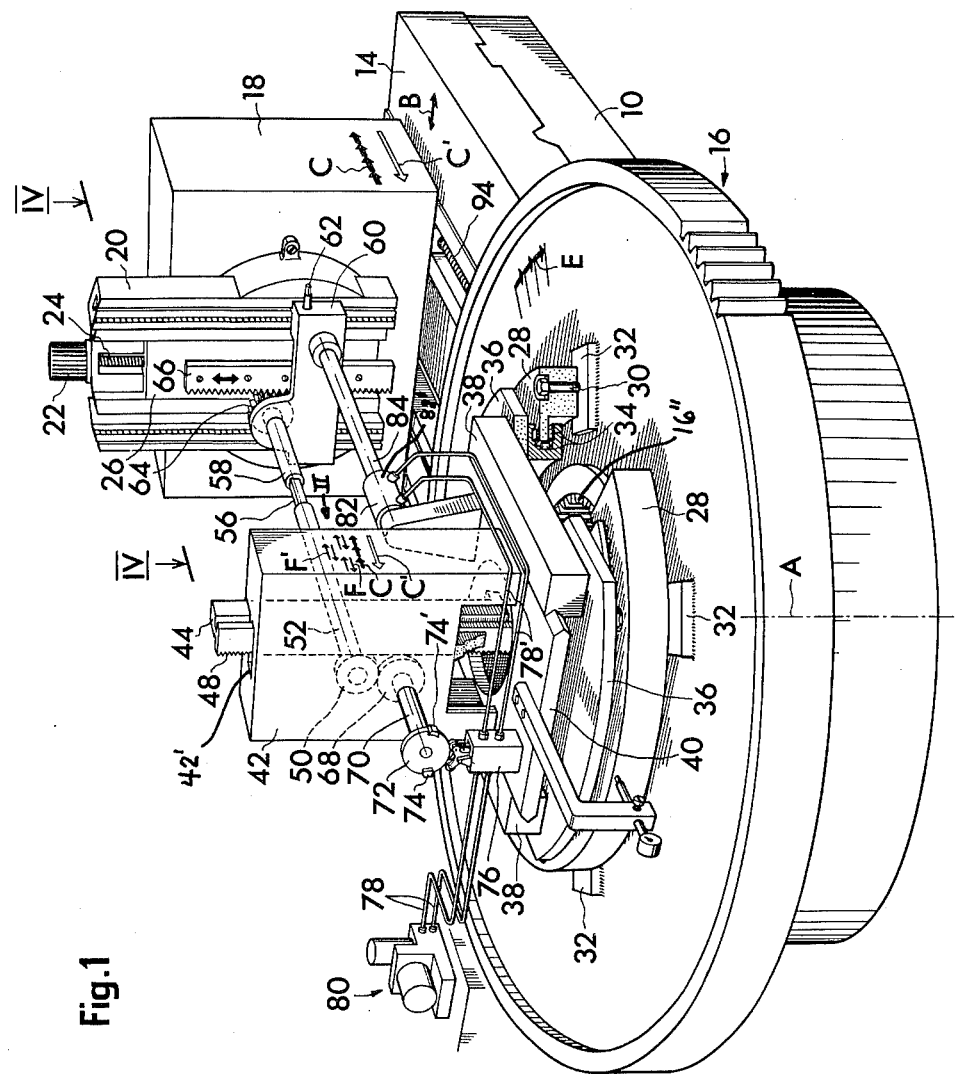
FIG. 1 is a perspective view of a known gear shaping machine and a workpiece and equipped with an apparatus constructed according to the invention.
Figure 2:
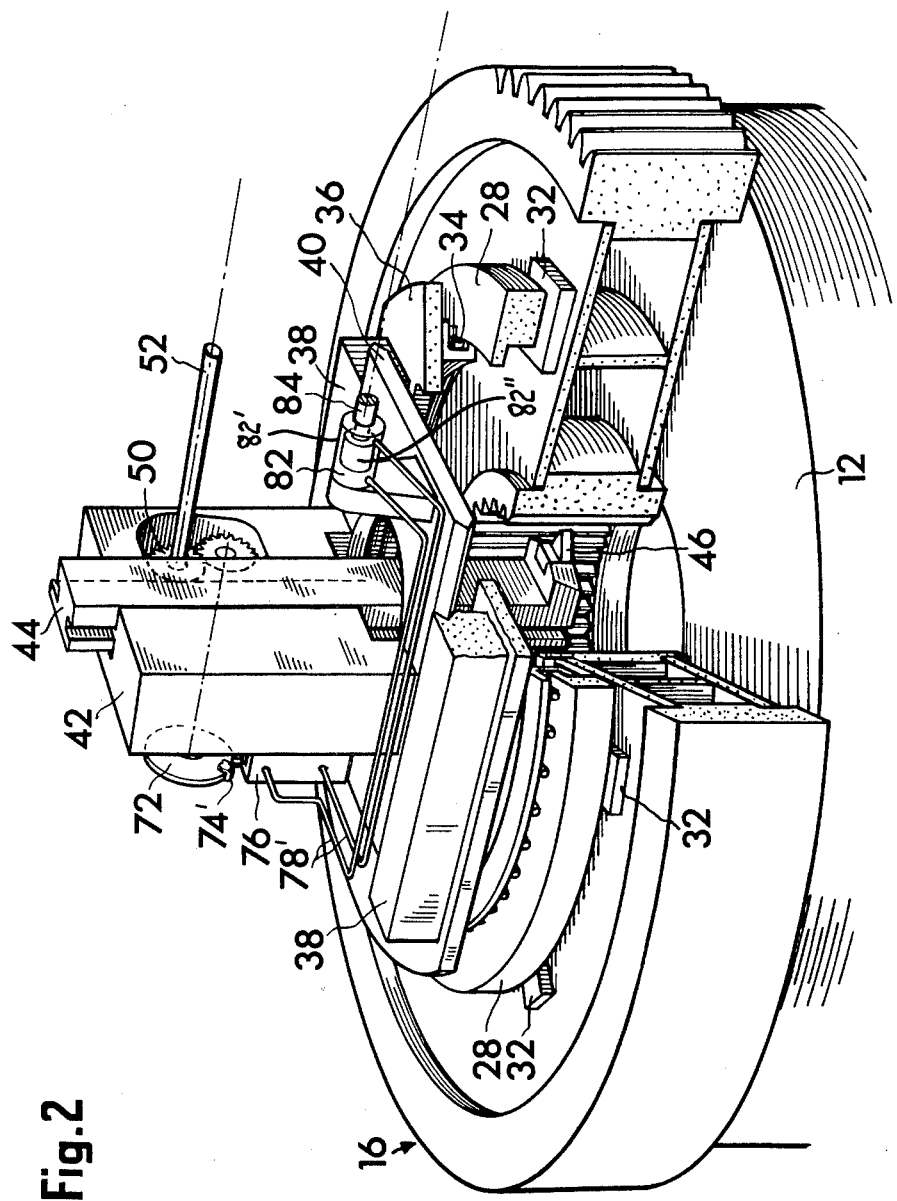
FIG. 2 is a perspective view of part of the apparatus of FIG. 1, looking in the direction of the arrow II thereof.
Figure 3:
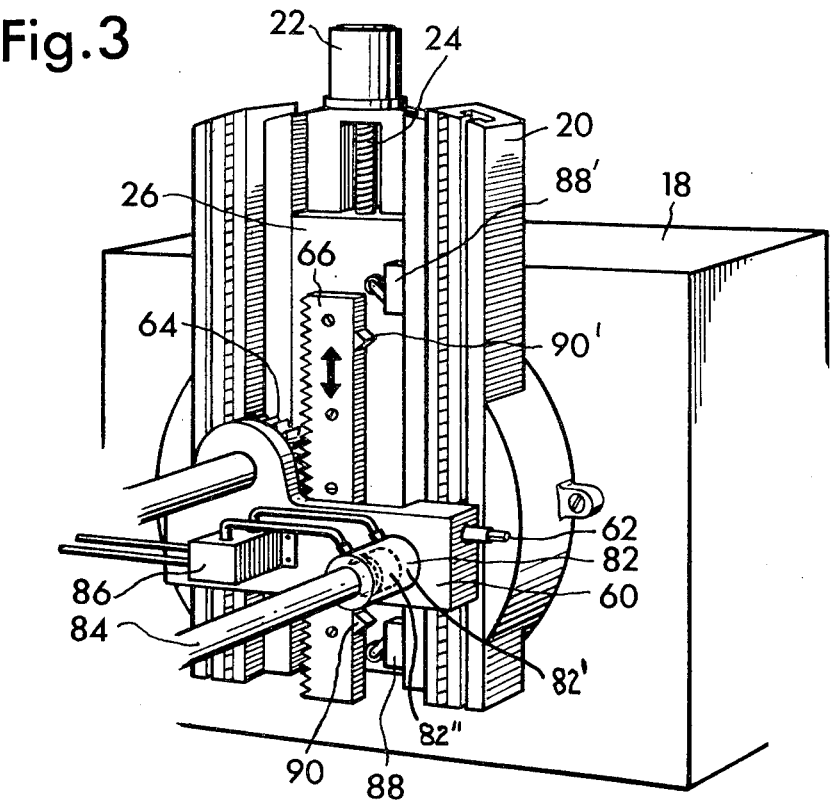
FIG. 3 is a sectional view of the arrangement of FIG. 1 showing modified details of the apparatus.
Figure 4:
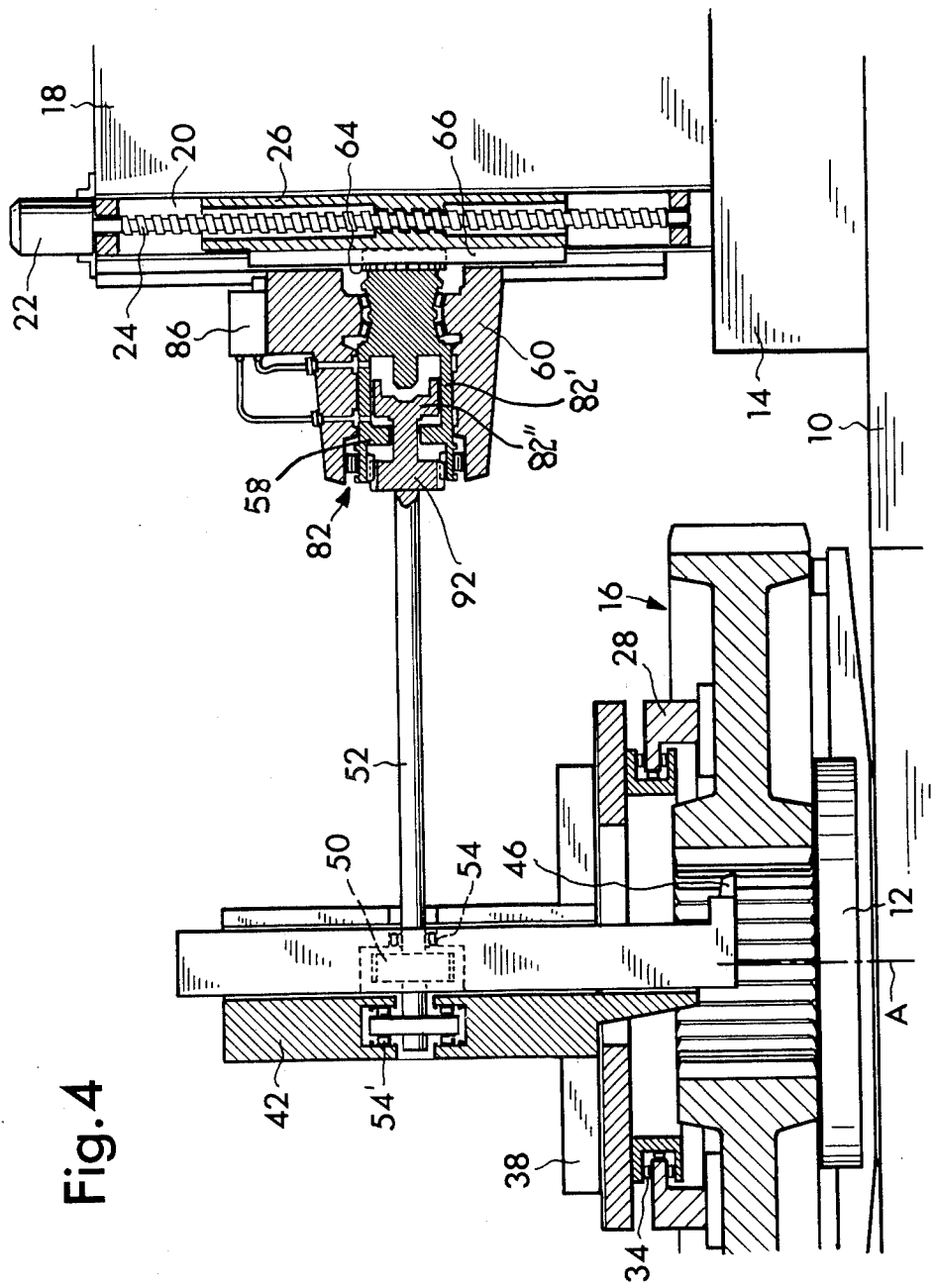
FIG. 4 is a vertical sectional view of the arrangement of FIG. 1, taken substantially along the line IV—IV thereof, showing further modified details of the apparatus.

Describing now the drawings, the exemplary embodiment of gear shaping machine or gear shaper, particularly as shown in FIG. 1, will be seen to comprise a machine bed 10 upon which there is rotatably mounted a workpiece table 12 about an essentially vertical axis A. Furthermore, upon the machine bed 10 there is displaceably guided a bed carriage or slide 14, in the direction of the double-headed arrow B, tangentially with respect to the workpiece table 12. Secured at the workpiece table 12 is a workpiece 16 having a lengthwise axis. This workpiece 16 is shown provided with external teeth 16' and should be provided with internal teeth 16''. Displaceably guided upon the bed carriage 14 is a stand or upright 18, movable in the direction of the arrows C and C' radially with respect to the workpiece table 12. At the stand or upright 18 there is attached a plunger guide or plunger guide means 20 which is rotatably adjustable about a radial rotational axis in relation to the workpiece table 12. The plunger guide or guide means 20, in the illustrated embodiment, has been shown vertically adjusted. At the plunger guide 20 there is attached an electric motor 22 or other suitable drive. A spindle 24 is rotatably mounted at the plunger guide 20, spindle 24 being in threaded meshing engagement with a plunger 26 displaceable at the plunger guide 20. Also constituting part of the gear shaping machine is a not particularly visible drive arranged below the workpiece table 12, by means of which this workpiece table 12 can be rotated, in increments or steps of adjustable length, in the direction of the arrows E or in the opposite direction, these adjustable increments or steps being accommodatable to the pitch of each of the teeth 16' and 16'' of the workpiece 16.

What has been described above essentially corresponds to the standard construction of a gear shaping machine or gear shaper as is known in the art.

Now installed upon the workpiece 16 is an apparatus for fabricating internal teeth 16''. As concerns this apparatus the same comprises a bearing rim or collar 28, or equivalent structure, which is secured exactly coaxially with respect to the workpiece 16 and the workpiece table 12 upon such workpiece. For attachment purposes there are used, by way of example, in the illustrated embodiment, threaded bolts 30 or the like, extending through the bearing rim 28 and being threaded into support or contact plates 32. These support plates 32 are, for instance, welded or otherwise suitably affixed at the workpiece 16 and machined in such a manner that, their upper faces or surfaces come to lie in a common plane extending exactly perpendicular to the workpiece axis A. At the bearing rim 28 there is rotatably mounted, by means of extremely precise axial and radial bearings 34, a rotatable plate 36 about the workpiece axis A. Upon the rotatable plate 36 there are secured two guide rails 38 arranged perpendicular to and in spaced relationship from the workpiece axis A. These guide rails or rail members 38 guide an auxiliary stand carriage or slide 40 upon which there is secured an auxiliary stand 42.

Now there is guided in the guide or guide means 42' of the auxiliary stand 42 so as to be vertically displaceable an auxiliary plunger 44, at the lower end of which there is attached a gear cutting or shaping tool 46 in the